(12) United States Patent
Zhou et al.

(10) Patent No.: US 8,179,628 B2
(45) Date of Patent: May 15, 2012

(54) MAGNETIC CORE PLASMON ANTENNA WITH IMPROVED COUPLING EFFICIENCY

(75) Inventors: Yuchen Zhou, San Jose, CA (US); Tobias Maletzky, Milpitas, CA (US); Xuhui Jin, San Jose, CA (US); Zhigang Bai, Milpitas, CA (US); Kenichi Takano, Santa Clara, CA (US); Erhard Schreck, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 152 days.

(21) Appl. No.: 12/803,874

(22) Filed: Jul. 8, 2010

(65) Prior Publication Data

US 2012/0008229 A1    Jan. 12, 2012

(51) Int. Cl.
G11B 5/02 (2006.01)
G11B 11/00 (2006.01)

(52) U.S. Cl. ........................ 360/59; 369/13.33
(58) Field of Classification Search .......... None
See application file for complete search history.

(56) References Cited

U.S. PATENT DOCUMENTS

| | | | |
|---|---|---|---|
| 6,538,617 | B2 | 3/2003 | Rochelle |
| 8,036,069 | B1 * | 10/2011 | Jin et al. ................ 369/13.32 |
| 2008/0192376 | A1 | 8/2008 | Tanaka et al. |
| 2008/0198496 | A1 | 8/2008 | Shimazawa et al. |
| 2009/0201600 | A1 | 8/2009 | Komura et al. |
| 2010/0027161 | A1 | 2/2010 | Takagishi et al. |
| 2010/0073802 | A1 * | 3/2010 | Komura et al. ............ 360/59 |
| 2010/0103553 | A1 | 4/2010 | Shimazawa et al. |
| 2010/0142079 | A1 * | 6/2010 | Tanaka et al. ............ 360/59 |
| 2010/0315735 | A1 * | 12/2010 | Zhou et al. ............ 360/59 |
| 2011/0111133 | A1 * | 5/2011 | Zhou et al. ............ 427/547 |

OTHER PUBLICATIONS

Co-Pending US Patent HT09-003, U.S. Appl. No. 12/456,290, filed Jun. 15, 2009, Plasmon Antenna with Magnetic Core for Thermally Assisted Magnetic Recording, assigned to the same assignee as the present invention.

* cited by examiner

*Primary Examiner* — Daniell L Negron
*Assistant Examiner* — Regina N Holder
(74) *Attorney, Agent, or Firm* — Saile Ackerman LLC; Stephen B. Ackerman

(57) ABSTRACT

A TAMR (Thermal Assisted Magnetic Recording) write head uses the energy of optical-laser generated plasmons in a magnetic core plasmon antenna to locally heat a magnetic recording medium and reduce its coercivity and magnetic anisotropy. To enable the TAMR head to operate most effectively, the maximum gradient and value of the magnetic recording field should be at a point of the magnetic medium that is as close as possible to the point being heated. In addition, the coupling between the optical mode and the plasmon mode should be efficient so that maximum energy is transmitted to the medium. The present invention achieves both these objects by surrounding the magnetic core of a plasmon antenna by a variable thickness plasmon generating layer, whose thinnest and shortest portion is at the ABS end of the TAMR head and whose thickest and longest portion efficiently couples to the optical mode of a waveguide to produce a plasmon.

34 Claims, 10 Drawing Sheets

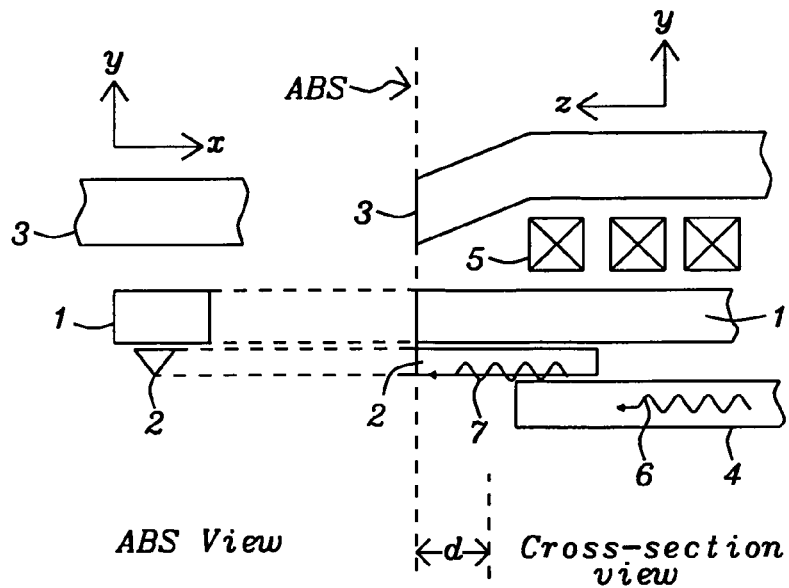
FIG. 1 - Prior Art
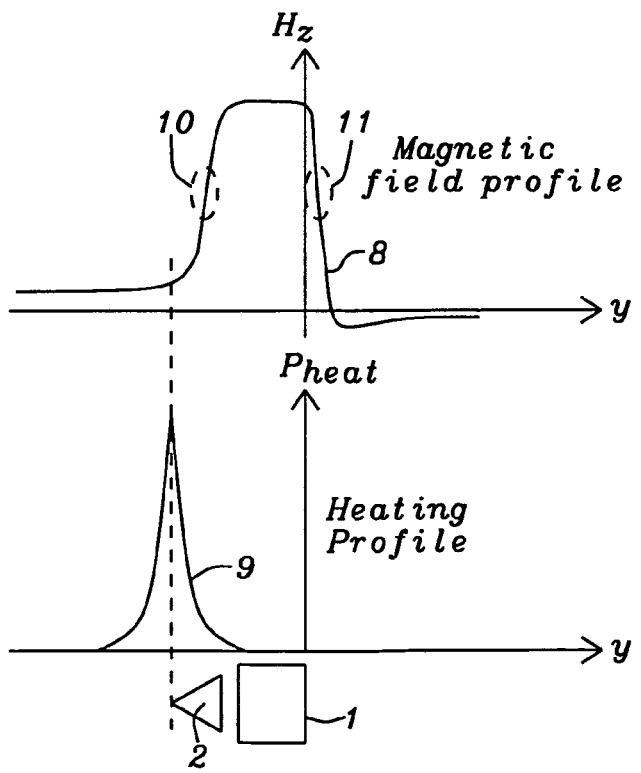
FIG. 2 - Prior Art

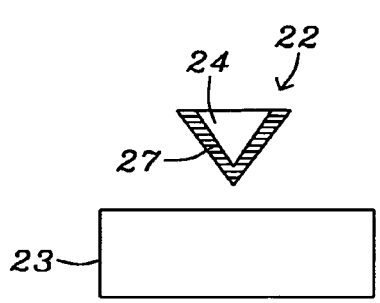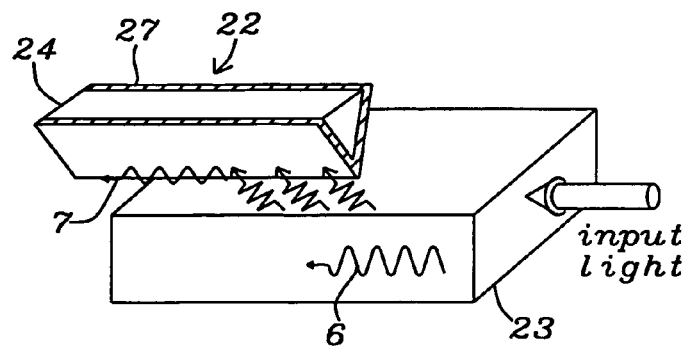
*FIG. 3A*     *FIG. 3B*
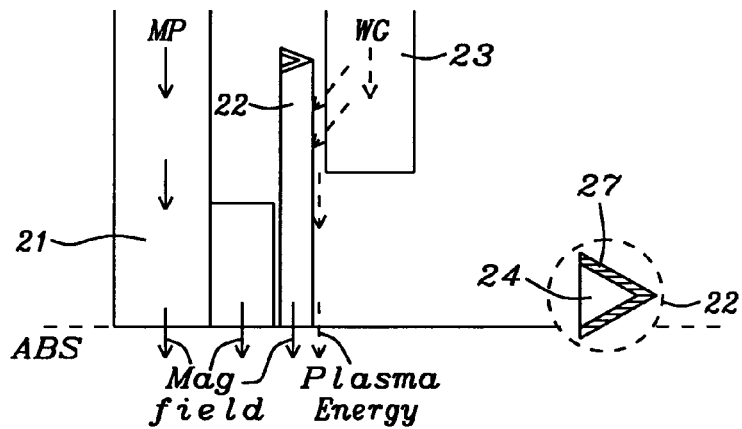
Magnetic core antenna (MCA)
*FIG. 4*
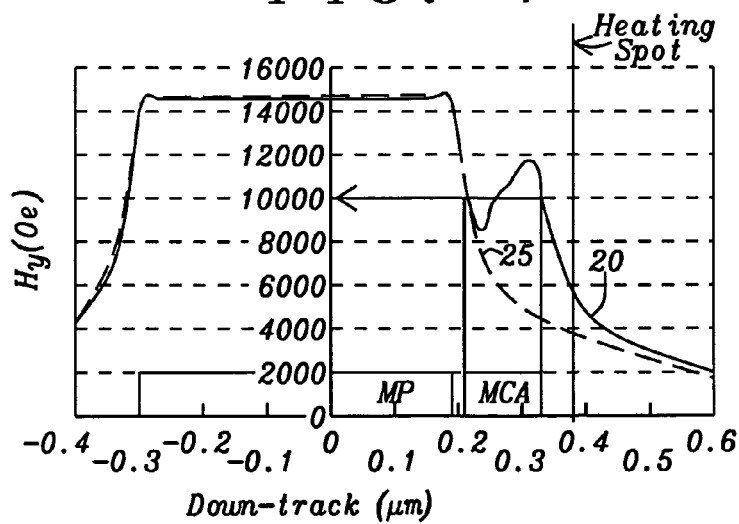
*FIG. 5*

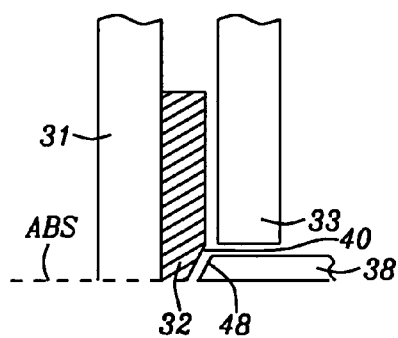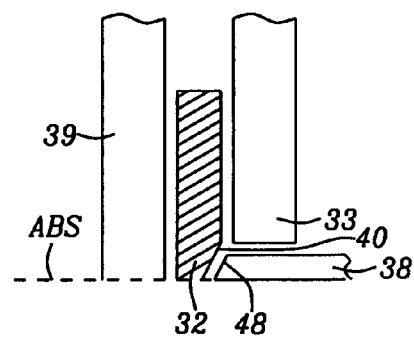
FIG. 16A            FIG. 17A
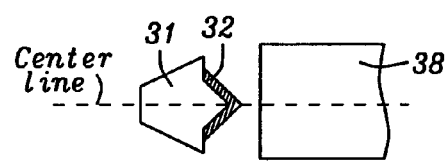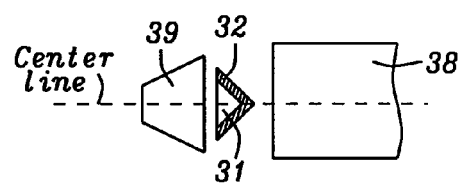
FIG. 16B            FIG. 17B
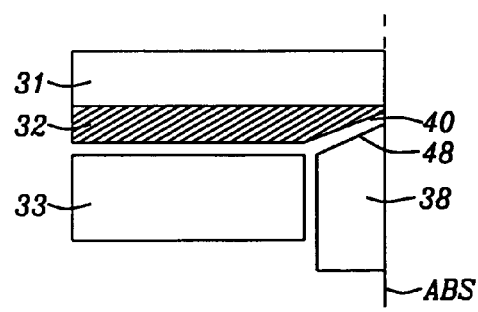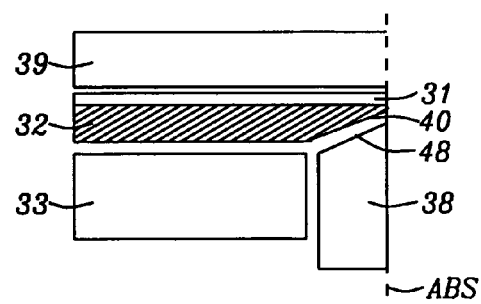
FIG. 16C            FIG. 17C

MAGNETIC CORE PLASMON ANTENNA WITH IMPROVED COUPLING EFFICIENCY

BACKGROUND OF THE INVENTION

1. Field of the Invention

This invention relates to the fabrication of magnetic read/write heads that employ TAMR (thermally assisted magnetic recording) to enable writing on magnetic media having high coercivity and high magnetic anisotropy. More particularly, it relates to the use of a plasmon antenna (PA) to transfer the required thermal energy from the read/write head to the media.

2. Description of the Related Art

Magnetic recording at area data densities of between 1 and 10 Tera-bits per $in^2$ involves the development of new magnetic recording media, new magnetic recording heads and, most importantly, a new magnetic recording scheme that can delay the onset of the so-called "superparamagnetic" effect. This latter effect is the thermal instability of the extremely small regions on which information must be recorded, in order to achieve the required data densities. A way of circumventing this thermal instability is to use magnetic recording media with high magnetic anisotropy and high coercivity that can still be written upon by the increasingly small write heads required for producing the high data density. This way of addressing the problem produces two conflicting requirements:

1. The need for a stronger writing field that is necessitated by the highly anisotropic and coercive magnetic media.
2. The need for a smaller write head of sufficient definition to produce the high areal write densities, which write heads, disadvantageously, produce a smaller field gradient and broader field profile.

Satisfying these requirements simultaneously may be a limiting factor in the further development of the present magnetic recording scheme used in state of the art hard-disk-drives (HDD). If that is the case, further increases in recording area density may not be achievable within those schemes. One way of addressing these conflicting requirements is by the use of assisted recording methodologies, notably thermally assisted magnetic recording, or TAMR.

The prior art forms of assisted recording methodologies being applied to the elimination of the above problem share a common feature: transferring energy into the magnetic recording system through the use of physical methods that are not directly related to the magnetic field produced by the write head. If an assisted recording scheme can produce a medium-property profile to enable low-field writing localized at the write field area, then even a weak write field can produce high data density recording because of the multiplicative effect of the spatial gradients of both the medium property profile and the write field. These prior art assisted recording schemes either involve deep sub-micron localized heating by an optical beam or ultra-high frequency AC magnetic field generation.

The heating effect of TAMR works by raising the temperature of a small region of the magnetic medium to essentially its Curie temperature ($T_C$), at which temperature both its coercivity and anisotropy are significantly reduced and magnetic writing becomes easier to produce within that region.

In the following, we will address our attention to a particular implementation of TAMR, namely the transfer of electromagnetic energy to a small, sub-micron sized region of a magnetic medium through interaction of the magnetic medium with the near field of an edge plasmon excited by an optical frequency laser. The transferred electromagnetic energy then causes the temperature of the medium to increase locally.

The edge plasmon is excited in a small conducting plasmon antenna (PA) approximately 200 nm in width that is incorporated within the read/write head structure. The source of optical excitement can be a laser diode, also contained within the read/write head structure, or a laser source that is external to the read/write head structure, either of which directs its beam of optical radiation at the antenna through a means of intermediate transfer such as an optical waveguide (WG). As a result of the WG, the optical mode of the incident radiation couples to a plasmon mode in the PA, whereby the optical energy is converted into plasmon energy, This plasmon energy is then focused by the PA onto the medium, at which point the heating occurs. When the heated spot on the medium is correctly aligned with the magnetic field produced by the write head pole, TAMR is achieved. The following prior arts describe such TAMR implementations in various forms.

K. Shimazawa et al. (US Publ. Pat. App. US2010/0103553) describes TAMR structures that utilize edge plasmon mode coupling. Shimazawa et al. shows a near-field light generator composed of an electroconductive material such as Au. No magnetic materials are disclosed.

Rochelle, (U.S. Pat. No. 6,538,617) describes an antenna for sensing magnetic fields that employs a ferrite magnetic core.

Takagishi et al. (US Publ. Pat. App. 2010/0027161) discloses an antenna having two magnetic layers with a noble metal layer between them.

Komura et al. (US Publ. Pat. Appl. 2009/0201600) teaches improving plasma generation efficiency by means of a V-shaped groove and a projection facing the deepest part of the groove in a structure formed of non-magnetic materials.

Y. Zhou et al. (US Appl. # U.S. Ser. No. 12/456,290 (2009) discloses a plasmon antenna with a magnetic core for thermally assisted magnetic recording.

None of these prior arts address the issues to be dealt with by the present invention, as will now be described in greater detail.

Referring first to FIG. 1, there is shown a schematic illustration of an exemplary prior art TAMR structure in an ABS (shown as a dashed line) view and in a side cross-sectional view. The dimensional directions in the ABS view are indicated as x-y coordinates (in the ABS plane), with the x coordinate being a cross-track coordinate in the plane of the medium and the y coordinate being a down-track direction. In the vertical (y-direction) cross-sectional view, the x coordinate would emerge from the plane of the drawing and the z coordinate is in the direction towards the ABS of the head (the "distal" direction).

The conventional magnetic write head includes a main magnetic pole (MP) (1), which is shown with a rectangular ABS shape, a writer coil (5) (three winding cross-sections drawn) for inducing a magnetic field within the pole structure and a return pole (3). Generally, magnetic flux emerges from the main magnetic pole, passes through the magnetic media and returns through the return pole.

The optical waveguide (WG) (4) guides optical frequency electromagnetic radiation (6) towards the air bearing surface (ABS) of the write head. The ABS end of the write head will also be called its distal end and the ends of all components that are closest to the ABS will be called their distal ends. The plasmon antenna (PA) (2), which has a triangular shape in the ABS plane, extends distally to the ABS and is adjacent to the MP (1). The distal end of the waveguide (4) is not at the ABS, but terminates at a depth, d, away from the ABS. An optical frequency mode (6) of the electromagnetic radiation couples to the edge plasmon mode (7) of the PA (2) and energy from the edge plasmon mode is then transmitted to the media surface where it heats the surface locally at the ABS edge of the PA triangle.

An advantage of the design illustrated in this figure is that the WG (4) terminates before reaching the ABS of the write head so that leakage of visible radiation to the ABS is reduced. Meanwhile, the energy from the edge plasmon mode (7), upon reaching the ABS, can achieve a spatially confined region that is desirable for achieving a high thermal gradient in the magnetic medium. With the long PA body (2) and large volume of metal composing the PA, heating damage of the PA is also greatly reduced.

In the prior art cited above, the materials used to form the PA are metals like Ag and Au that are known to be excellent in generating optically driven plasmon modes. However, in the prior art a problem still exists in aligning the optical heating profile within the region of energy transfer at the medium surface, with the magnetic field profile generated by the write head.

Referring to FIG. 2, there are shown schematically a typical prior art magnetic field profile (8) and below it, a heating profile (9), such as would be produced by the TAMR writer of FIG. 1 at the position of the heating spot (the peak of the profile) on the magnetic medium. The horizontal coordinate axis in both graphs is the y-coordinate of FIG. 1. The vertical axis is the magnetic field, $H_z$, in the magnetic field profile and the heat intensity, $P_{heat}$, in the heating profile. Both profiles are localized within a small region of the magnetic medium. For reference purposes, the ABS shape of the PA (2) and the ABS shape of the MP (1) (also shown in FIG. 1) are drawn below the axes, so the location of the field and heat transfer can be ascertained.

As can be seen in FIG. 2, the heating spot is at the far leading edge of the magnetic field profile produced by the MP. Although this location will allow sufficient writing resolution with enough heating, it is not the optimal positioning of the two curves relative to each other. To obtain the full benefit of TAMR, the slope of the heating profile (9) should be aligned with the encircled regions of maximum slope (10) or (11), of the magnetic field profile. In this case, a multiplicative factor of the two maximum gradients is obtained.

Due to structural limitations, caused, for example, by the thickness and arrangement of the WG and by choice of the PA design, difficulties in alignments during fabrication, etc., optimal alignment of the heating and field profiles cannot be obtained.

Referring to FIG. 3A, there is shown a schematic illustration of a front view (looking up at the ABS) of a portion of a simplified version of an alternative form of TAMR prior art as disclosed by Zhou et al. (cited above). The figure shows the ABS of the plasmon antenna (22) and the distal face (recessed from the ABS) of the adjacent optical waveguide (23). The plasmon antenna (22) has a core (24) formed of magnetic material, partially surrounded by a layer (27) (shown shaded for clarity) of a non-magnetic highly conductive metal (such as Au or Ag). The antenna is formed in the shape of an elongated prism (more clearly illustrated in the following figure), here shown as a prism with an (exemplary) triangular, or approximately triangular cross-section. We shall hereinafter call such an antenna, with its core of magnetic material, an MCA (magnetic core antenna).

Referring to FIG. 3B, there is shown a schematic perspective view of the same system as in FIG. 3A. The position of the antenna (22) with its vertex just above a face of the waveguide (23) promotes coupling of the edge plasmon (7), which is substantially confined to the vertex region of the conductive coating (27), to the electromagnetic optical mode (6) within the waveguide. The magnetic core (24) of the plasmon antenna serves to channel the magnetic flux of the main writer pole (not shown in this figure) so that it will align optimally with the thermal energy profile produced by the plasmon field within the magnetic medium.

Referring to FIG. 4, there is shown a schematic illustration of a side cross-sectional view of a particular arrangement of the type of MCA TAMR head structure already shown in FIG. 3B. In this illustration the main pole (21) of a magnetic writer has affixed (or adjacently mounted) to it the magnetic core plasmon antenna (22) (MCA) of the previous invention of FIG. 3B. The MCA (22) and main pole (MP) (21) share a common ABS (shown as a dashed line). A waveguide (WG) (23) is mounted adjacent to the antenna, MCA (22), and recessed vertically relative to the ABS. A schematic illustration of the ABS face of the MCA is shown encircled with a dashed line, to indicate the magnetic core (24), such as a core of FeCo or NiFe, partially overcoated with a layer (27) of Au (shown shaded for emphasis). In this configuration the flat face of the MCA, which is opposite the vertex and not covered by the overcoat (27), is parallel to the trailing edge of the MP, while the vertex of the MCA, which supports the edge plasmon mode, faces away from the trailing edge of the MP and is immediately adjacent to the WG (23). The WG is downtrack of the MCA and its distal end is vertically above the ABS. Dashed arrows from WG (23) to MCA (22) indicate the coupling of radiation from WG to the MCA. Arrows indicate the magnetic field emanating from both the pole, MP, (21) and antenna (22) and plasmon energy being emitted from the antenna as well. Of course the magnetic field from the antenna is emitted by its core (24), and the plasmon energy is emitted from its overcoat (27).

During recording, the magnetic field produced by the MP (21) magnetizes the core of the MCA (24) and can even saturate the core if the spacing is small, literally zero spacing being quite appropriate. Thus, the magnetic core of the antenna can be considered a part of the MP structure rather than the MCA structure, in that its role is to direct magnetic flux to the spot on the medium being heated rather than contribute to the heat generating properties of the edge plasmon mode.

Referring to FIG. 5, there is shown a graphical simulation of the magnetic field distribution of the pole (21) of FIG. 4, with two curve segments showing the distribution in both the presence (20) (solid line) and absence (25) (dashed line) of the MCA. In the simulation, the absent MCA actually corresponds to a plasmon antenna of pure Au, with no magnetic core. The horizontal axis of the graph indicates microns of distance downtrack from the center of the pole. The spot on the medium being heated is approximately 0.35 microns downtrack of the pole center. As can be seen, the magnetic field intensity distribution is essentially constant across the width of the pole, which lies between −0.3 and +0.2 microns (labeled MP). In the absence of the MCA (dashed line (25)), the magnetic field intensity decays sharply beyond the lateral dimensions of the pole.

In the presence of the MCA (solid line (20)), the magnetic field intensity rises (to approximately 10 kOe, compared to the value of approximately 4 kOe in the absence of the MCA) and peaks at approximately the trailing edge of the MCA, then has a sharp gradient at approximately 0.35 microns. However, the actual spot being heated is located at approximately 0.4 microns, which is at or beyond the outer edge of the plasmon generating layer (27) in FIG. 4. This indicates that the strongest field and steepest gradient of the magnetic field profile in the presence of the MCA is at the edge of the magnetic core ((24) in FIG. 4), while the actual spot being heated is at the edge of the generating layer ((27) in FIG. 4) that covers the core. These results indicate that to reduce the distance between the peak field and gradient and the peak point of heating, a thin MCA plasmon generating layer is preferred.

However, FIG. 6 shows the graphical simulation results of the transmitted power through the edge plasmon mode at various MCA plasmon layer thicknesses. In these simulations, the MCA is assumed to have a uniform core size and plasmon layer thickness along the MCA length. Both Ag alloy and Au films are considered. The power value indicated on the vertical axis of the graph is the percentage of the power transmitted in the MCA plasmon mode relative to that transmitted using a pure Au antenna. The figure indicates that as the plasmon layer thickness decreases, the efficiency of the coupling of the optical energy to the plasmon mode is significantly reduced. Thus, less heating of the medium is expected with thinner plasmon generating layers. Therefore, a trade-off exists between reducing the separation between the position of the magnetic field peak and the heating peak and achieving efficient heating of the recording medium. The prior arts cited above do not address this trade-off or methods of dealing with it advantageously.

SUMMARY OF THE INVENTION

It is a first object of the present invention to produce a TAMR head structure in which the separation between the application point of maximum magnetic field to a magnetic medium and the point being heated on that same magnetic medium is optimized, without significantly affecting the plasmon mode coupling efficiency to the optical mode in the antenna of the TAMR head structure.

It is a second object of this invention to minimize the energy loss during the coupling of the plasmon mode in the antenna to the optical mode in the waveguide of the TAMR head structure.

It is a third object of the present invention to achieve the previous objects without resorting to a significant variation in present fabrication technologies of TAMR head recording structures.

These objects will be achieved by means of a plasmon antenna design in a TAMR head in which the MCA has a core of magnetic material, such as CoFe or NiFe, overcoated with a plasmon generating layer (PGL) of non-magnetic highly conductive metal, such as Au or Ag, that is formed to a variable thickness and in which the plasmon mode will be generated. Within the coupling length of optical mode to plasmon mode coupling in the PGL, the thickness of the PGL will be made sufficient to impose little loss of coupling efficiency. The PGL thickness then is quickly reduced as the ABS of the TAMR head is approached so that the magnetic core edge of the antenna ((24) in FIG. 4) is much closer to the PGL edge ((27) in FIG. 4). Thus, as can be seen in the graphical representation of FIG. 5, the separation between magnetic field peak and heating peak is reduced. Since the thin portion of the PGL only occupies a short portion of the MCA close to the ABS, the total efficiency of the plasmon coupling will be very little affected.

Referring to schematic FIGS. 7A, B, C and D there are shown examples of MCAs with variable thickness PGLs. FIG. 7A shows an example where the MCA is integrated with the magnetic write pole (MP), i.e. the PGL (32) is formed over an actual extension of the pole itself (31) which serves as the magnetic core of the MCA. In the figure, an ABS view (b) is shown immediately below a side view (a). As can be seen in (b), the horizontal cross-section of the MP has been shaped to form a triangular prismatic extension (34) over which the PGL (32) has been formed. The optical wave guide (WG) (33) is adjacent to the PGL of the MCA and only partially overlaps it, so the distal end of the WG is not co-planar with the ABS of the MP and MCA. This recession of the distal end of the WG from the ABS of the MCA is preferred, but is not required.

FIG. 7C shows a vertical cross-section of the side view of FIG. 7A, (a), showing how the PGL (32) (shaded for clarity) varies in thickness towards the ABS end of the structure. The thicker portion is longer than the thinner portion so that there is a sufficient length for efficient coupling of the optical mode and the plasmon mode to occur within the region of overlap between (32) and (33).

FIG. 7B, (a) and (b) show side and ABS views respectively of an alternative configuration to FIG. 7A wherein the MCA ((31) and (32)) is physically separated from the MP (39). The MCA now has a separate magnetic core (31) and is partially covered by the PGL (32). The separation (38) between the core (31) and the MP (39) will be filled by a layer of non-conducting, non-magnetic material. Separation is preferably less than 100 nm and the region of separation is preferably filled with an oxide such as $Al_2O_3$ or $SiO_2$.

FIG. 7D, like FIG. 7C, shows a vertical cross-section of the side view of FIG. 7B, (a), showing how the PGL (32) (shaded for clarity) varies in thickness towards the ABS end of the structure. The thicker portion is longer than the thinner portion so that there is a sufficient length for efficient coupling of the optical mode and the plasmon mode to occur.

FIG. 7E shows a more detailed schematic view of a vertical cross-section of the side view of the MCA of either of the previous configurations (a) of FIG. 7A or FIG. 7B, showing how the PGL (32) varies in thickness towards the ABS end of the structure. Three exemplary vertical cross-sections in the horizontal plane, (50), (51) and (52) taken at various positions along the MCA are shown, to indicate more precisely how the thickness of the PGL (32) varies towards the ABS. In the cross-section (52), closest to the ABS, the thickness (34) is preferably less than or equal to 60 nm. The thickest portion (35), shown in cross-section (50), away from the ABS, should be at least 10 nm thicker than the thinnest portion. The total length (37) of the MCA that is covered by the PGL is preferably at least twice the length of the portion covered by the thinnest PGL layer (36).

It should be noted that during an actual recording process, either of the TAMR heads of FIG. 7A or FIG. 7B (or of the remaining embodiments to be described below) can be moving relative to the medium in either the direction MP to MCA to WG, or in the opposite direction of WG to MCA to MP. Such directional choice depends on the actual magnetic field profile and heating profile in the medium, which determines the direction of the movement for achieving the highest possible recording density. Thus, the MCA can be placed on either the trailing edge or the leading edge of the MP in an actual TAMR head. However, in either case the idea of using variable PGL thickness to obtain a higher plasmon coupling efficiency is the same.

Referring now to FIGS. 8A, 8B and 8C, there is shown the graphical results (shown in FIG. 8C) of a simulation comparing the plasmon coupling efficiency (vertical axis in FIG. 8C) to PGL thickness at the ABS, for two exemplary MCA configurations: FIG. 8A, an MCA with uniform PGL thickness (two identical horizontal cross-sections being shown); FIG. 8B (similar to FIG. 7E) an MCA with tapered PGL thickness (three, different, horizontal cross-sections being shown). The PGL layer is assumed to be a layer of Au and the MCA core is assumed to be FeCo. For both cases FIG. 8A and FIG. 8B the total length (37) of the MCA is 2 microns. For the uniformly thick PGL of the MCA in FIG. 8A (thicknesses (35) =(34)) the thickness is a constant 190 nm.

For the MCA with variable thickness PGL of FIG. 8B, the length of the thin portion (36) is 100 nm and the thickness of this portion, (34) is varied between 20 nm and 200 nm. The length of the variable thickness transition region (30) is 200 nm. The thickness of the thick region (35) is 190 nm. The graph of C shows that the tapered PGL has about twice the plasmon coupling (or generation) efficiency of the uniform PGL at an ABS thickness of 20 nm. The trend lines of the graph show that the advantage of the tapered MCA over the uniform MCA is even larger at thinner ABS PGL thicknesses. Such an advantage makes the tapered MCA ideal for reducing the spacing between the magnetic field profile and the heating profile while keeping high enough heating in the medium as a result of the efficient coupling of the optical to plasmon modes.

Referring now to schematic FIGS. 9A-9G there is shown a sequence of process steps by which the MCA with variable PGL thickness of the previous figures (eg. FIG. 8B) can be efficiently and advantageously manufactured. It should be apparent to those skilled in the art how these process steps can be applied to the fabrication of the eight embodiments to be described below. In these process steps the MCA is formed on the trailing edge of the MP. In each of the FIGS. 9A-9G, the leftmost figure is an "ABS view" looking up at the fabrication from the ABS, while the rightmost figure is a vertical cross-section taken through the center of the MCA along a plane perpendicular to the ABS plane. The ABS plane is at the rightmost edge of each figure. The steps below indicate the process step that corresponds to each figure.

(A) A non-magnetic substrate (51) is provided.
(B) A tapered trench (52) is formed in the substrate by a photolithographic or etching process.
(C) A first PGL layer (53) is deposited conformally filling the trench (52).
(D) A mask (54) is formed over a portion of the PGL layer extending back from the ABS.
(E) A second layer of PGL (55) is deposited over the first layer (53) in the region behind the mask (54). In the ABS view, the outline of the second layer is shown as a dashed line, although the layer itself is invisible behind the mask.
(F) The mask is removed showing the stepped layers of the PGL, (53), (55).
(G) Deposition or electro-plating of magnetic material (56) directly over both the PGL layers. The deposition (56) will be the core of the MCA, (53) and (55) is the stepped-thickness PGL now covering the core.

BRIEF DESCRIPTION OF THE DRAWINGS

The objects, features, and advantages of the present invention are understood within the context of the Description of the Preferred Embodiment as set forth below. The Description of the Preferred Embodiment is understood within the context of the accompanying figures, wherein:

FIG. 1 is a schematic drawing of a prior art TAMR design,
FIG. 2 is a schematic graphical representation of the magnetic field profile and heating profile of the prior art design of FIG. 1
FIGS. 3A and 3B are schematic illustrations showing front (3A) and perspective views (3B) of an antenna/waveguide configuration of a prior art design.

FIG. 4 is a schematic illustration showing the positioning of the plasmon antenna, waveguide and magnetic write pole of the prior art design of FIG. 3B.
FIG. 5 is a graphical illustration showing the difference in magnetic field and heating profile alignments for the prior art antenna of FIG. 4.
FIGS. 16A, 16B and 16C are three views of a schematic illustration of a Seventh Embodiment of the present invention.
FIGS. 17A, 17B and 17C are three views of a schematic illustration of a Eighth Embodiment of the present invention.

DESCRIPTION OF THE PREFERRED EMBODIMENTS

Each of the preferred embodiments of this invention is a TAMR head for producing high density recording on a magnetic medium. The TAMR head incorporates a plasmon antenna formed as a variable thickness plasmon generating layer (PGL) conformally covering at least two sides of a prism-shaped core of magnetic material. In the embodiments to be described below, the prism shaped core has an exemplary horizontal, cross-sectional tapered shape that approximates a triangle. The PGL conformally covers the vertex of the triangle and the two opposite sides that form the vertex. Other shapes of the core are also possible and other conformal coverings are also possible.

The PGL supports the generation and transmission of a plasmon mode that is produced by efficient coupling at the thickest region of the PGL with an optical mode generated by an adjacent source of optical radiation such as an optical frequency laser and guided to the antenna by a device such as an optical waveguide. By locating this magnetic core antenna (MCA) adjacent to a magnetic write pole (MP), with the thinnest portion of the PGL at the ABS, a magnetic writing field is produced whose peak strength and gradient are superimposed with the near field of the plasmon mode so that the magnetic medium is both heated and written upon at the same point.

As noted above, the radiative coupling efficiently generates edge plasmon modes within the thickest region of the PGL, with little loss of energy from the optical radiation. As a result, associated electromagnetic near-fields of the plasmon emerge at the thinnest portion of the PGL and impinge on a small surface area of the magnetic medium very near the point at which the write field emerges, generating thermal energy with a spatially dependent profile within that area and causing the temperature of that area to increase. The magnetic pole of the writer produces a magnetic writing field, with a spatially dependent field intensity profile that impinges on a surface area that essentially overlaps optimally with the plasmon field. The spatial alignment of the thermal energy distribution and the magnetic field is such that there is substantial overlap at their regions of maximum gradient. This overlap increases the effectiveness of the magnetic field in changing the local magnetization of the magnetic medium so that magnetic writing on the medium is greatly enhanced and can be confined to extremely small surface areas.

First Embodiment

Figure 6:
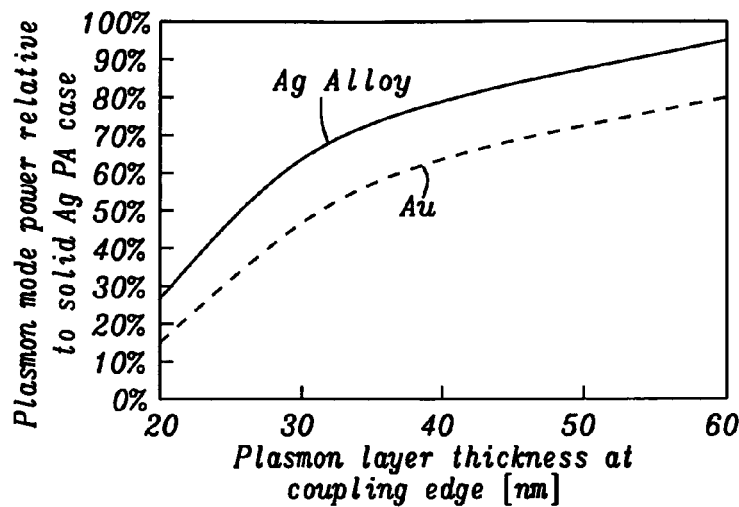
FIG. 6 is a graphical result of a simulation showing the relationship between the thickness of plasmon generating layers and the resulting efficiency of coupling between optical and plasmon modes in the layers.
Figure 7A:
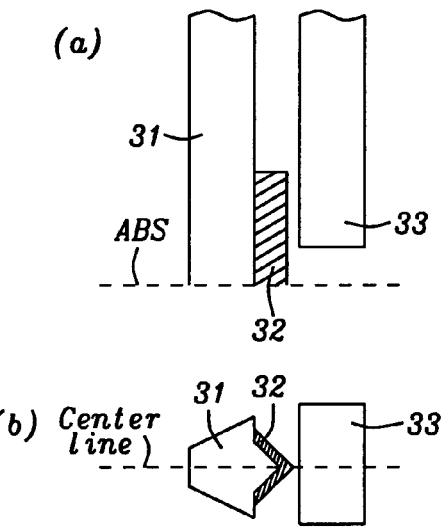
FIGS. 7A(a) and (b), 7B(a) and (b), 7C, 7D and 7E are schematic illustrations showing various configurations of an MCA with the variable thickness PGL of the present invention.
Figure 7B:
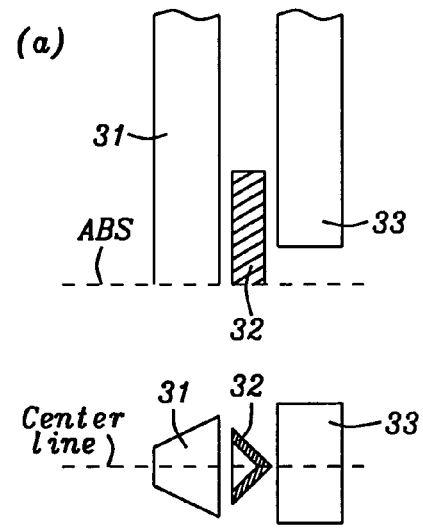
Figure 7C:
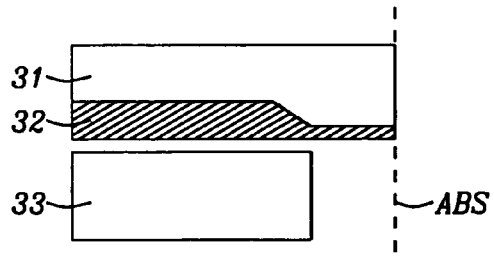
Figure 7D:
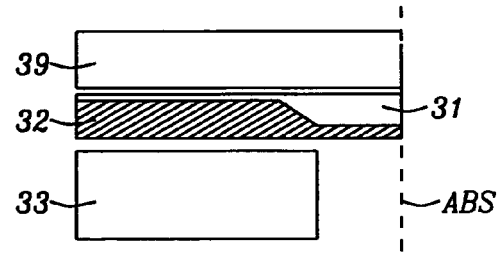
Figure 7E:
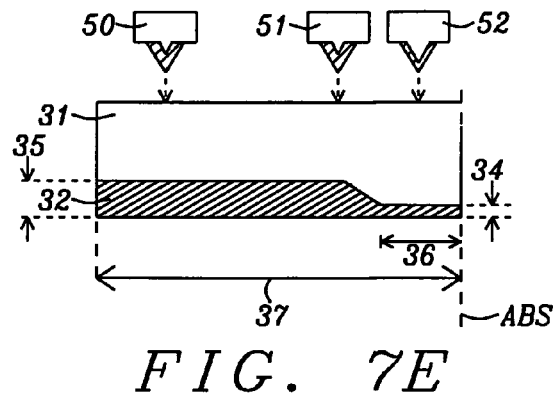
Figure 8A:
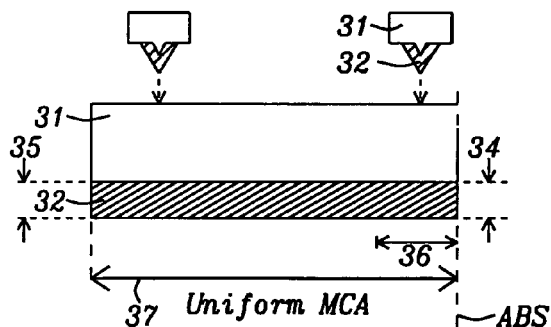
FIGS. 8A, 8B and 8C compare plasmon coupling efficiencies (8C) of a prior art MCA with a uniform PGL (8A) and an MCA of the present invention with a variable thickness PGL of the present invention (8B).
Figure 8B:
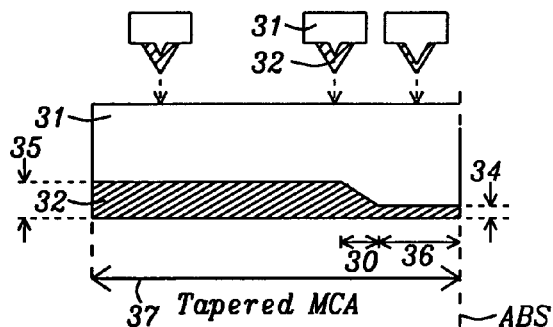
Figure 8C:
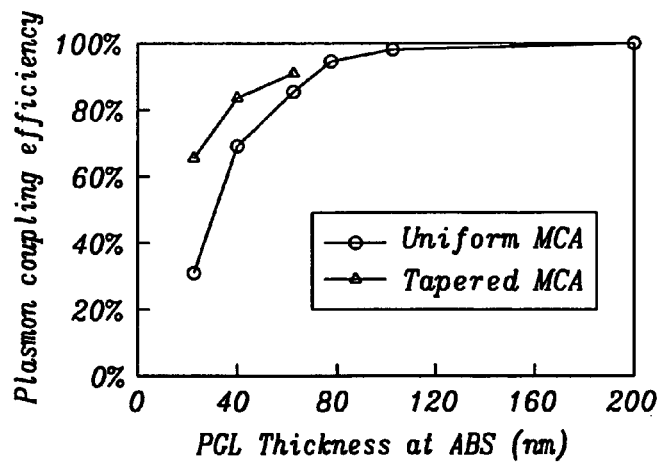
Figure 9A:
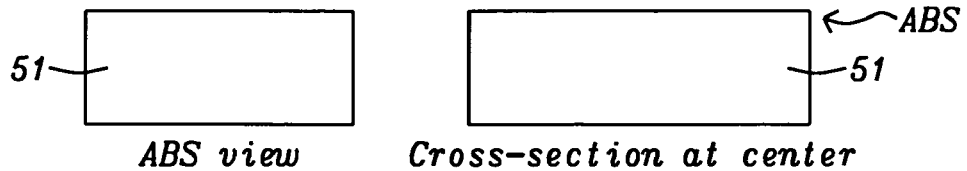
FIGS. 9A, 9B, 9C, 9D, 9E, 9F and 9G show a schematic sequence of process steps by which an MCA of the present invention is formed.
Figure 9B:
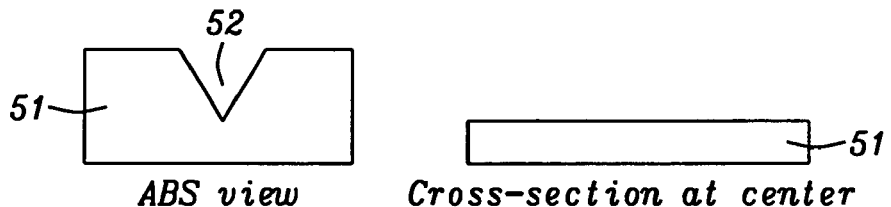
Figure 9C:
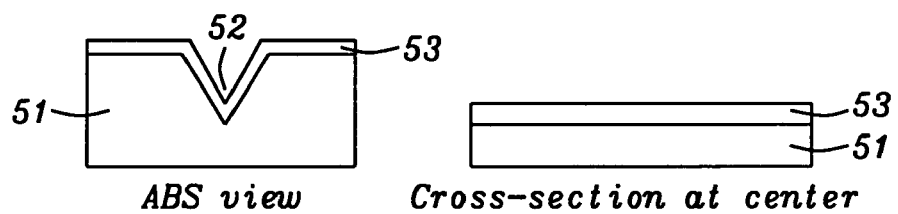
Figure 9D:
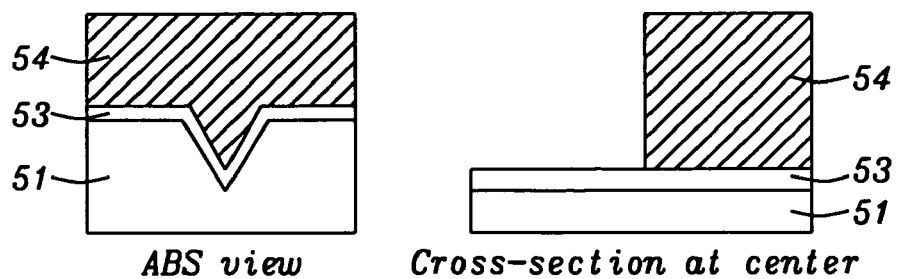
Figure 9E:
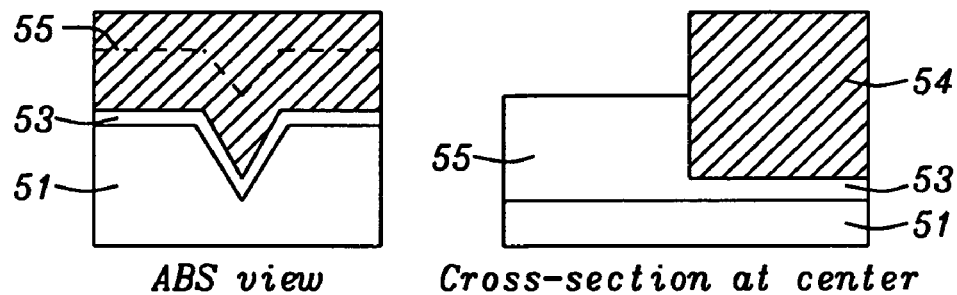
Figure 9F:
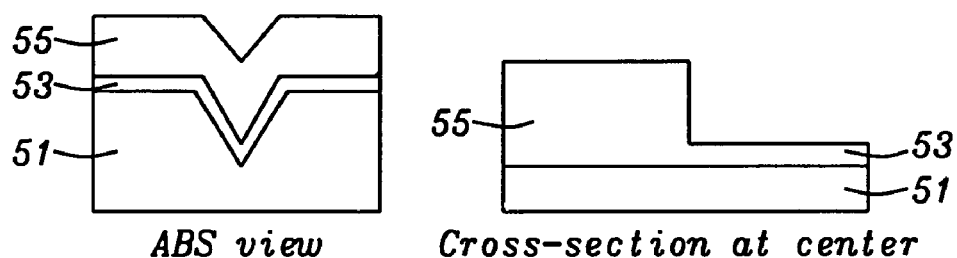
Figure 9G:
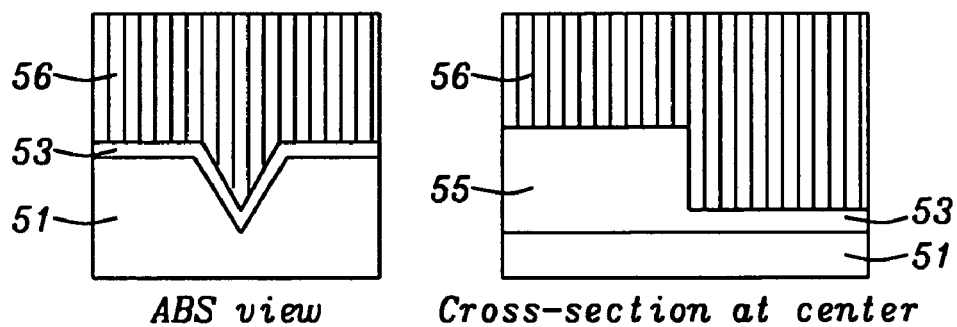
Figure 10A:
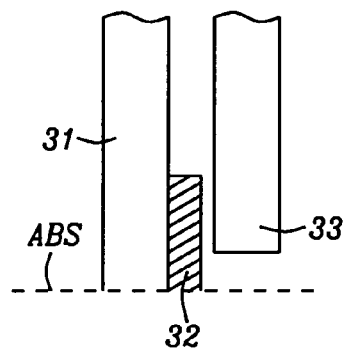
FIGS. 10A, 10B and 10C are three views of a schematic illustration of a First Embodiment of the present invention.

Referring to schematic FIGS. 10A, B and C, there is shown a side view (A), an ABS view (B) and a vertical cross-sectional view (C) of a first embodiment of a TAMR head that has a magnetic write pole (shaped so that it also forms a magnetic core for the plasmon antenna) (31) over which is formed a PGL of varying thickness (32). There is also an optical waveguide (33) adjacent to the plasmon antenna. Thus, the magnetic core of the plasmon antenna is an integral part of the MP and is, in fact, formed from the material of the MP itself. The PGL conformally covers two opposite sides of the core.

Figure 10B:
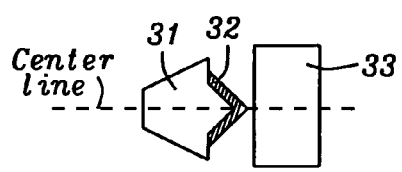
Figure 11B:
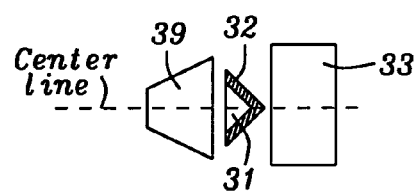
Figure 10C:
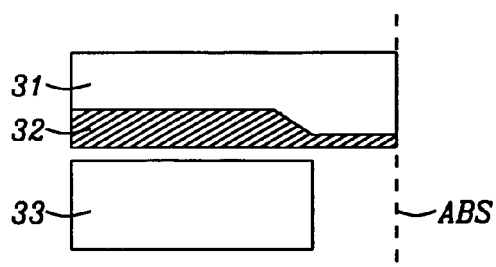
Figure 11C:
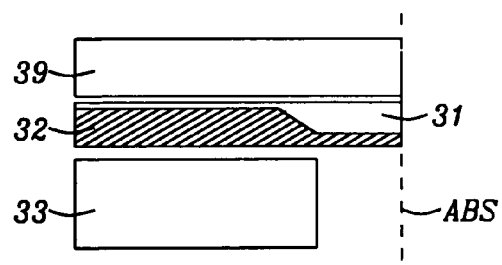

In this embodiment and all other embodiments the ABS cross-sectional shape of the MP has been given an exemplary trapezoidal form, with the magnetic core of the antenna either projecting out from the widest edge of the MP if it is formed as an integral part of the MP (as in this first embodiment), or adjacent to the widest edge of the MP, if it is a separate core. The antenna core has been given an exemplary triangular shape, i.e., it is formed as two planar sides tapering towards a vertex, with the vertex being farthest from the MP. Since the antenna core is a solid prism, its vertex will form a line that is collinear with the MP. The PGL will be formed so that it covers this vertex and the two tapering sides that meet to form the vertex. As can be seen in the ABS view of FIG. 10B, the pole and antenna are symmetric about a center line that passes through the vertex of the PGL. This will also be the case in all succeeding embodiments.

In the first four embodiments, the vertex of the PGL will remain a fixed distance from the MP, but in embodiments five through eight, the vertex will slope towards the MP in a direction towards the ABS.

The waveguide is positioned opposite the vertex of the PGL and adjacent to its thickest region for efficient generation of plasmons. During the recording process, the magnetic pole generates a magnetic field to switch the magnetizations of medium grains. The plasmon antenna, combining the core (31) and the PGL (32), transmits electromagnetic energy from an edge plasmon mode to the medium at which point the medium is heated to reduce its coercivity and anisotropy. The plasmon mode is, in turn, generated by optical radiation within the waveguide (33) that couples to the PGL (32) of the plasmon antenna. The electromagnetic energy of the plasmon mode produces localized heating of the medium through absorption of electric field energy from the plasmon mode by the medium.

The thicker portion of the PGL, farthest from the ABS, is comparatively longer than the thinner portion. The thickness of the thin region, beginning at the ABS tip of the MCA, is equal to or less than approximately 60 nm, with its length extending away from the ABS for a distance less than or equal to approximately 500 nm. The thicker end of the PGL, farthest away from the ABS, has a thickness that is preferably at least 10 nm thicker than the thin portion. The total length of the PGL, consisting of a thin region, a thick region and, a transitional region, is preferably at least twice the length of the thin region (i.e., at least 1000 nm). The minimal spacing between the WG (33) and the vertex of the PGL (32) is preferably less than 50 nm. The distal end of the WG is preferably recessed from the ABS of the MCA, but this is not a requirement.

Second Embodiment

Figure 11A:
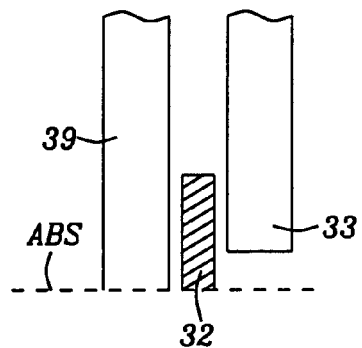
FIGS. 11A, 11B and 11C are three views a schematic illustration of a Second Embodiment of the present invention.

Referring now to schematic FIGS. 11A, B and C, there is shown a second embodiment that is in every respect the same as the first embodiment except that the MP (39) and the MCA ((31) and (32)) are separate and disconnected structures. Note that the MP is here labeled (39) to distinguish it from the separate magnetic core (31) of the MCA, which in this embodiment has the shape of a triangular prism with its vertex being a straight line that is substantially parallel to the MP. In the following embodiments, when the MP also forms the core of the MCA it will be numbered (31), when the MP is separate from the core of the MCA (as in this embodiment), the MP will be numbered (39) and the core of the MCA will be numbered (31).

During recording, the magnetic field from the MP (39) also magnetizes the magnetic core (31) of the MCA, which produces a magnetic write field in the medium in addition to the field of the MP. Separation between the MP and the MCA is preferably less than 100 nm and the region of separation is preferably filled with a non-conductive, non-magnetic material, preferably an oxide such as $Al_2O_3$ or $SiO_2$.

Third Embodiment

Figure 12A:
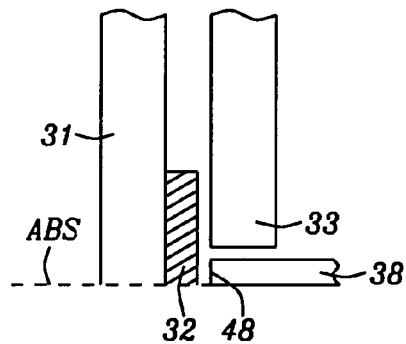
FIGS. 12A, 12B and 12C are three views of a schematic illustration of a Third Embodiment of the present invention.

Referring to schematic FIGS. 12A, B and C, there is shown a schematic side view, an ABS view and a vertical cross-sectional view of a third embodiment of the present invention, in which there is formed a TAMR head that, like the first embodiment, includes an MCA that is a variable thickness PGL (32) formed directly on a portion of the MP (31) so that the MCA becomes an integral part of the MP. As in the first embodiment there is a WG (33) adjacent to the vertex of the PGL and alongside the thickest portion of the PGL for the most efficient coupling of optical and plasmon energies. During the recording process, the magnetic field is generated by the magnetic core (31) of the MCA and transmitted into the recording medium. The optical mode in the WG (33) couples to the PGL and generates a plasmon mode that is transmitted along the MCA towards the ABS of the TAMR head. The near field of this plasmon mode impinges on the recording medium and heats it locally. The PGL (32) is thinner close to the ABS (34) than farther away from the ABS. The thicker portion of the PGL is longer than the thinner portion so that an efficient coupling between the optical mode and the plasmon mode can occur. The thinnest portion of the PGL may be less than or equal to 60 nm in thickness and it is approximately 500 nm in length. The thicker portion of the PGL is preferably at least 10 nm thicker than the thinnest portion. The total length (37) of the PGL is preferably at least twice the length (36) of the thinnest portion. The minimal spacing between the WG structure and the PGL vertex edge is preferably less than 50 nm. The WG preferably terminates above the ABS, but this is not a necessity. A magnetic write shield (38) is positioned at the same side as the WG relative to the MCA and is located between the distal end of the WG and the ABS. The distance between the PGL edge facing the WG (33) and the shield (38) is preferably between approximately 10 nm and 500 nm. The distance between the WG (33) and the shield (38) is preferably less than the total length (37) of the MCA. The thickness of the write shield (38) at the end facing the MCA is preferably less than or equal to approximately 500 nm. The vertex of the PGL is substantially a straight line. In addition, a thin layer of PGL material, having a thickness of between approximately 10 and 20 nm can be deposited on surface (48) of shield (38) facing the vertex of PGL (32), which helps in reducing the size of the heating spot in the medium.

Fourth Embodiment

Figure 13A:
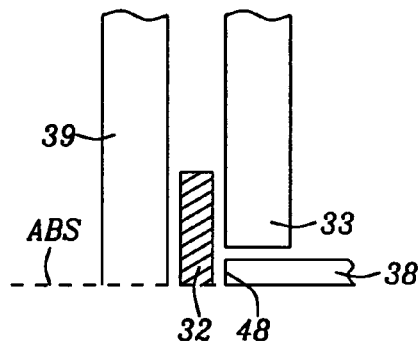
FIGS. 13A, 13B and 13C are three views of a schematic illustration of a Fourth Embodiment of the present invention.
Figure 12B:
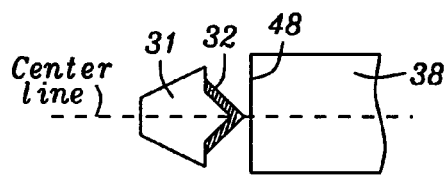
Figure 13B:
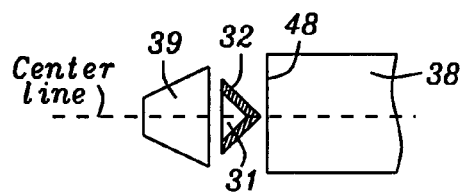
Figure 12C:
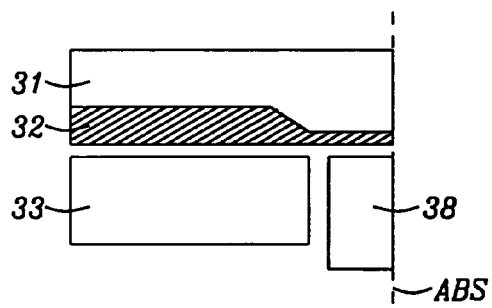
Figure 13C:
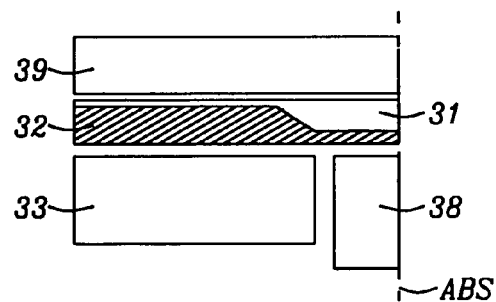

Referring now to schematic FIGS. 13A, B and C, there is shown a fourth embodiment that is in every respect the same as the third embodiment except that the MP (39) and the MCA ((32) and (31)) are separate and disconnected structures. During recording, the magnetic field from the MP (39) also magnetizes the magnetic core (31) of the MCA, which produces a magnetic write field in the medium in addition to the field of the MP. Separation between the MP and the MCA is preferably less than 100 nm and the region of separation is preferably filled with a non-conductive, non-magnetic material, preferably oxides such as $Al_2O_3$ or $SiO_2$. In addition, a thin layer of PGL material, having a thickness between approximately 10 and 20 nm, can be deposited on surface (48) of shield (38) facing the vertex of PGL (32), which helps in reducing the size of the heating spot in the medium.

Fifth Embodiment

Figure 14A:
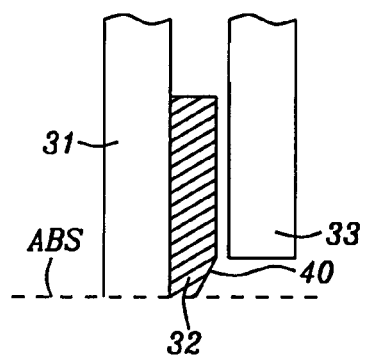
FIGS. 14A, 14B and 14C are three views of a schematic illustration of a Fifth Embodiment of the present invention.

Referring now to schematic FIGS. 14A, B and C, there is shown a fifth embodiment that is in every respect the same as the first embodiment except that the vertex edge is no longer a straight edge parallel to the MP as in the previous embodiments. The vertex edge now has two continuous portions, a first portion that is farthest from the ABS and is parallel to the MP and a second portion of the vertex edge (40) of the PGL that tapers towards the ABS end of the MP (31) as shown. It is noted that the tapering of the vertex edge may generally produce a reduction in the dimensions of the ABS cross-sectional shape of the PGL

Sixth Embodiment

Figure 15A:
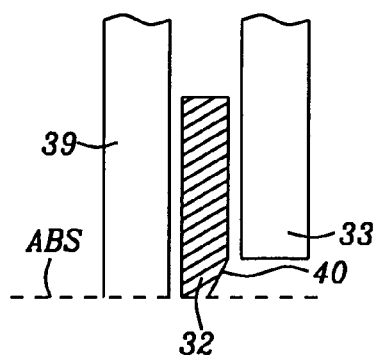
FIGS. 15A, 15B and 15C are three views of a schematic illustration of a Sixth Embodiment of the present invention.
Figure 14B:
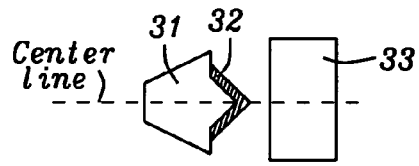
Figure 15B:
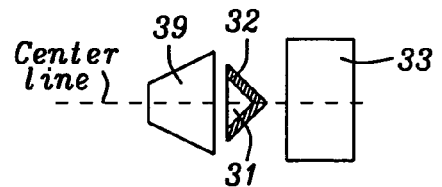
Figure 14C:
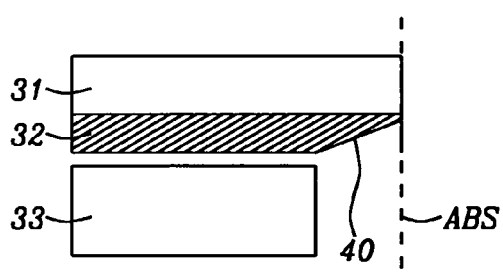
Figure 15C:
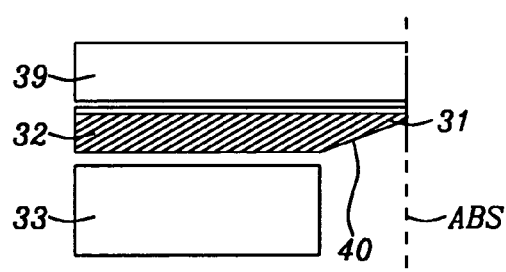

Referring now to schematic FIGS. 15A, B and C, there is shown a sixth embodiment that is in every respect the same as the second embodiment except that, as in the fifth embodiment, the vertex edge of the PGL is no longer a straight edge entirely parallel to the MP, but there is now a portion that tapers (40) towards the ABS end of the MP (39) as shown. It is noted that the tapering of the vertex edge may generally produce a reduction in the dimensions of the ABS cross-sectional shape of the PGL

Seventh Embodiment

Referring now to schematic FIGS. 16A, B and C, there is shown a seventh embodiment that is in every respect the same as the third embodiment except that a portion of the vertex edge (40) of the PGL is not an edge that is parallel to the MP, but is an edge that tapers (40) towards the MP (31) in the direction towards the ABS, while the write shield (38) edge (48) facing the PGL can, but is not required to, form a slope that is conformal to the tapered portion of the vertex edge (40) of the PGL. It is noted that the tapering of the vertex edge may generally produce a reduction in the dimensions of the ABS cross-sectional shape of the PGL In addition, a thin layer of PGL material, having a thickness between approximately 10 and 20 nm, can be deposited on surface (48) of shield (38) facing the vertex of PGL (40), which helps in reducing the size of the heating spot in the medium.

Eighth Embodiment

Referring now to schematic FIGS. 17A, B and C, there is shown an eighth embodiment that is in every respect the same as the fourth embodiment except that the vertex edge (40) of the PGL, along which the plasmon propagates is not a straight edge parallel to the MP, but is a straight edge that tapers towards the MP (39) in the direction towards the ABS, while the write shield (38) edge (48) facing the PGL can, but is not required to, form a slope that is conformal to the tapered portion of the plasmon carrying edge (40) of the PGL. It is noted that the tapering of the vertex edge may generally produce a reduction in the dimensions of the ABS cross-sectional shape of the PGL Separation between the MP and the MCA is preferably less than 100 nm and the region of separation is preferably filled with a non-conductive, non-magnetic material, preferably oxides such as $Al_2O_3$ or $SiO_2$. In addition, a thin layer of PGL material, having a thickness between approximately 10 and 20 nm, can be deposited on surface (48) of shield (38) facing the vertex of PGL (40), which helps in reducing the size of the heating spot in the medium.

As is understood by a person skilled in the art, the preferred embodiments of the present invention are illustrative of the present invention rather than being limiting of the present invention. Revisions and modifications may be made to methods, processes, materials, structures, and dimensions through which is formed and used a TAMR write head with a plasmon antenna having a PGL of varying thickness that provides an efficient coupling between an optical mode and a plasmon mode and optimizes a distance on a magnetic medium between a point of maximum magnetic write field and its gradient and a point of surface heating, while still providing such a TAMR write head, formed and used in accord with the present invention as defined by the appended claims.

What is claimed is:

1. A TAMR (thermally assisted magnetic recording) head comprising:
   a magnetic write pole which, when energized, produces a magnetic field for writing on a magnetic recording medium;
   a source of electromagnetic radiation;
   a waveguide for directing said electromagnetic radiation to a magnetic core plasmon antenna, said magnetic core plasmon antenna being formed as a variable thickness plasmon generating layer of conducting material conformally covering at least two opposing sides of a shaped magnetic core, wherein said waveguide couples said electromagnetic radiation to a plasmon mode generated within a region of said antenna adjacent to said waveguide; whereby
   said plasmon generating layer is thinnest at an ABS of said magnetic core plasmon antenna; and said plasmon generating layer is thickest within said region adjacent to said waveguide; whereby said plasmon antenna transfers energy generated by said plasmon mode to a localized region of said magnetic recording medium, thereby heating said localized region and reducing its magnetic coercivity and anisotropy; and wherein said magnetic core of said plasmon antenna directs said magnetic field onto said localized region, whereby the strength and gradient of said magnetic field within said localized region, combined with the thermal energy profile of said transferred plasmon mode thermal energy creates optimal conditions for writing within said region of reduced magnetic coercivity and anisotropy.

2. The device of claim 1 wherein said electromagnetic radiation is in the optical frequency range and said waveguide is an optical waveguide.

3. The device of claim 1 wherein said shaped magnetic core of said plasmon antenna is fabricated as an integral part of said magnetic pole, forming a shaped solid core of magnetic material projecting from said magnetic pole and extending linearly along said magnetic pole, over which shaped solid core is formed a plasmon generating layer of conducting material.

4. The device of claim 1 wherein said shaped magnetic core of said plasmon antenna is fabricated as a separate piece of solid shaped magnetic material, collinear with said magnetic pole and separated uniformly from said magnetic pole and over which is formed a plasmon generating layer of conducting material.

5. The device of claim 4 wherein said magnetic core is formed as a prism having a base that is parallel to said magnetic pole and is separated from said magnetic pole by an amount less than approximately 100 nm.

6. The device of claim 5 wherein said separation between said magnetic core and said magnetic pole is filled with a non-conductive, non-magnetic material, preferably either of the oxides $Al_2O_3$ or $SiO_2$.

7. The device of claim 1 wherein said plasmon generating layer is formed as a continuous sequence of three portions of similar horizontal cross-sectional shape, comprising:

a first portion, beginning at an ABS of said antenna and extending rearward therefrom, having a first length and a first thickness;

a third portion having a third thickness; and a second portion, having a variable thickness and forming a transition between said first and third portions.

8. The device of claim 7 wherein said first thickness is less than or equal to approximately 60 nm and wherein said first length is less than or equal to 500 nm.

9. The device of claim 8 wherein said third thickness at least 10 nm greater than said first thickness.

10. The device of claim 7 wherein the total length of said first, second and third portions of said plasmon generating layer is at least twice as long as said first length.

11. The device of claim 7 wherein said shaped magnetic core of said plasmon antenna is formed as a solid prism of triangular horizontal cross-section that is physically separated from said magnetic pole and collinear with said magnetic pole and wherein said plasmon generating layer conformally covers the vertex of said prism and covers the two prismatic faces defined by the sides of said triangular cross-section that meet to form said vertex and wherein a base of said triangular prism that is opposite to said vertex and adjacent to but uniformly separated from said magnetic pole is not covered by said layer of conducting material.

12. The device of claim 11 wherein said vertex forms a linear edge parallel to said magnetic pole.

13. The device of claim 11 wherein said vertex includes two continuous portions, a first portion of said vertex being a linear edge that is parallel to said magnetic pole and a second portion, that terminates at said ABS, being a linear edge that tapers towards said magnetic pole.

14. The device of claim 13 wherein said plasmon antenna and said magnetic pole terminate at the ABS plane of said TAMR and wherein a distal end of said waveguide terminates above said ABS plane.

15. The device of claim 14 further including a magnetic write shield having a first face that is coplanar with said ABS, having a second face that is parallel to said first face, wherein said second face is above said ABS and is adjacent to and parallel to said distal end of said waveguide, and having a third face, perpendicular to said first face and said second face, wherein said third face is adjacent to said vertex of said plasma generating layer.

16. The device of claim 15 wherein said third face is covered by a layer of plasmon generating material formed to a thickness between approximately 10 and 20 nm.

17. The device of claim 11 wherein said plasmon antenna is positioned between said waveguide and said magnetic pole and wherein said vertex of said plasmon antenna is positioned immediately adjacent to said waveguide and wherein the base of said prism is aligned parallel to a side of said magnetic pole and is uniformly separated from said side.

18. The device of claim 7 wherein said shaped magnetic core of said plasmon antenna is an integral part of said magnetic pole and is formed as a solid prism of triangular cross-section projecting from said magnetic pole and wherein said plasmon generating layer conformally covers the vertex of said prism and covers the two prismatic faces defined by the sides of said triangular cross-section that meet to form said vertex.

19. The device of claim 18 wherein said vertex forms a linear edge parallel to said magnetic pole.

20. The device of claim 18 wherein said vertex includes two continuous portions, a first portion of said vertex being a linear edge that is parallel to said magnetic pole and a second portion, that terminates at said ABS, being a linear edge that tapers towards said magnetic pole.

21. The device of claim 20 wherein said plasmon antenna and said magnetic pole terminate at an ABS plane of said TAMR and wherein a distal end of said waveguide terminates above said ABS plane.

22. The device of claim 21 further including a magnetic write shield having a first face that is coplanar with said ABS, having a second face that is parallel to said first face, wherein said second face is adjacent to and parallel to a distal end of said waveguide, and having a third face, formed at an angle to said first face and said second face, wherein said third face is adjacent to and conformal to said vertex of said plasma generating layer.

23. The device of claim 22 wherein said third face is covered by a layer of plasmon generating material formed to a thickness between approximately 10 and 20 nm.

24. The device of claim 18 wherein said plasmon antenna is positioned between said waveguide and said magnetic pole and wherein said vertex of said plasmon antenna is positioned adjacent to said waveguide.

25. The device of claim 1 wherein said magnetic core is formed of the magnetic materials FeCo, NiFe or of the elements Fe, Co, or B singly or in composites and wherein said conducting material is Au, Ag, Cu, Al, Ti, Ta or Ge or their alloys.

26. The device of claim 1 wherein said magnetic core plasmon antenna, said variable thickness plasmon generating layer and said waveguide are formed on a leading edge side of said magnetic pole.

27. The device of claim 1 wherein said magnetic core plasmon antenna, said variable thickness plasmon generating layer and said waveguide are formed on a trailing edge side of said magnetic pole.

28. A method of fabricating a magnetic core plasmon antenna with a variable thickness plasmon generating layer for a TAMR (thermally assisted magnetic recording) head comprising:

providing a substrate;

forming a tapered trench in said substrate;

forming a first layer of conducting material conformally lining at least said trench to a first thickness;

forming a masking layer over a first portion of said first layer of conducting material leaving exposed a second portion behind said first portion;

forming a second layer of conducting material, to a second thickness, conformally covering at least said second portion of said first layer;

removing said mask, leaving said trench conformally filled with a lining having a first thickness in said first portion and a thickness that is the sum of said first and second thicknesses in said second portion;

depositing a layer of magnetic material in said lined trench thereby conformally filling said lined trench with a magnetic core, whereby there is formed the magnetic core plasmon antenna with a variable thickness plasmon generating layer.

29. The method of claim 28 wherein said magnetic material is FeCo, NiFe or Fe, Co, or B singly or in composites and wherein said conducting material is Au, Ag, Cu, Al, Ti, Ta or Ge or their alloys.

30. The method of claim 28 wherein said tapered trench has a horizontal cross-section that is approximately triangular.

31. The method of claim 28 wherein said first portion has a length that is equal to or less than 500 nm and a thickness that is equal to or less than 60 nm.

32. The method of claim 28 wherein said second portion has a second thickness that is at least 10 nm thicker than said first thickness.

33. The method of claim 28 wherein said total length of said first and second portions is at least twice the length of said first portion.

34. The method of claim 28 wherein said mask is removed by a lift-off process or an etching process.

* * * * *